March 6, 1928.  1,662,035
F. L. SMITH ET AL
RETREAD MOLD FOR TIRES
Filed June 24, 1926   2 Sheets-Sheet 1
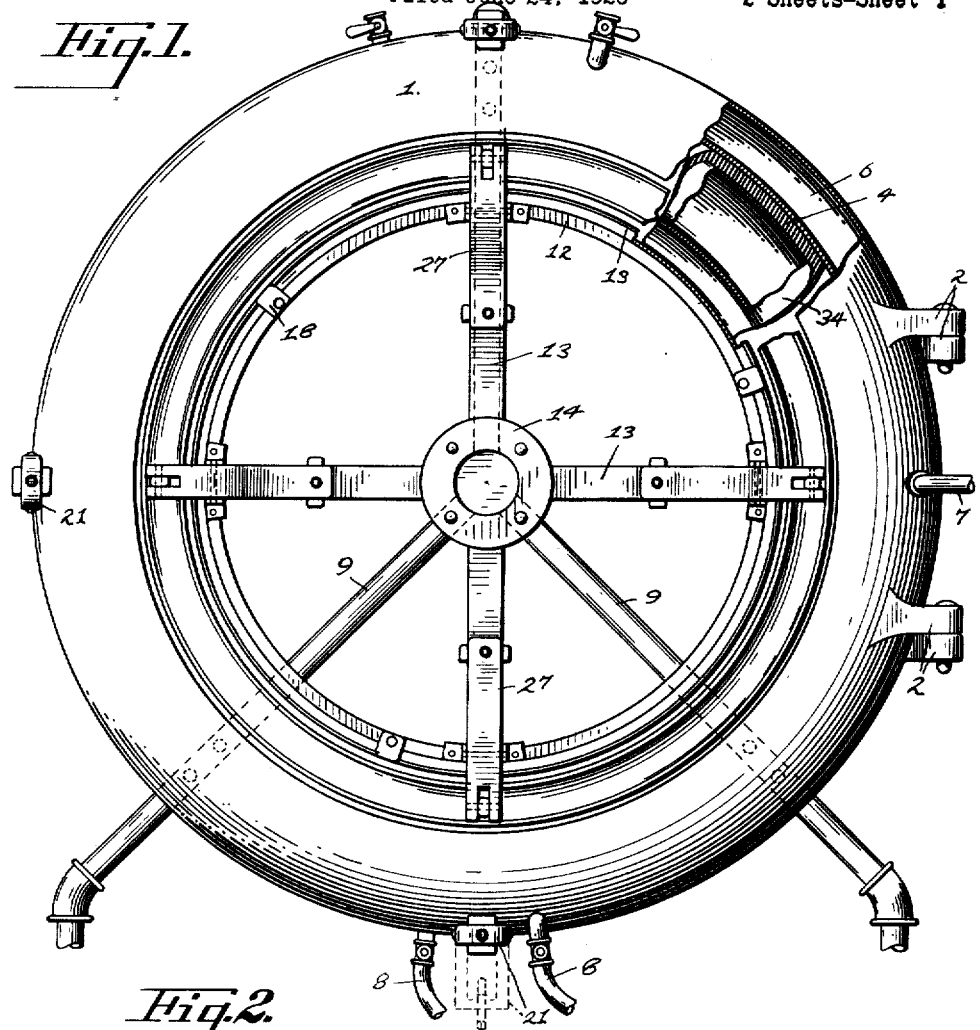
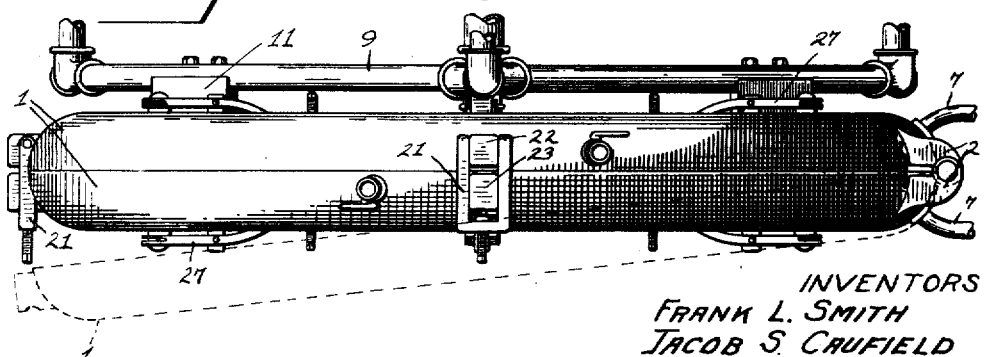
INVENTORS
FRANK L. SMITH
JACOB S. CAUFIELD
CHARLES J. PETERSON
BY Arthur L. Slee
ATTY.

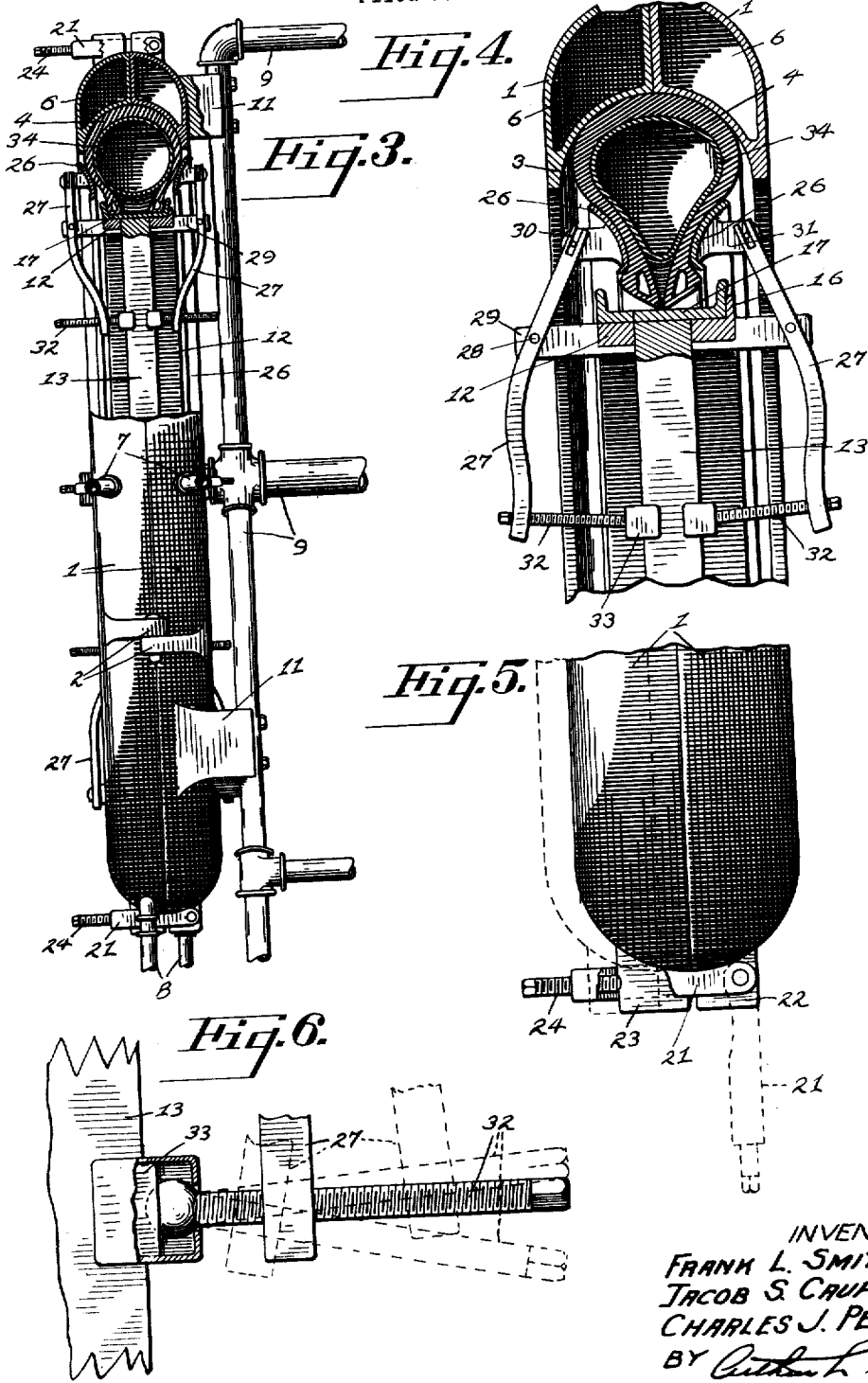

Patented Mar. 6, 1928.

1,662,035

UNITED STATES PATENT OFFICE.

FRANK L. SMITH, JACOB S. CAUFIELD, AND CHARLES J. PETERSON, OF SACRAMENTO, CALIFORNIA.

RETREAD MOLD FOR TIRES.

Application filed June 24, 1926. Serial No. 118,229.

Our invention relates to improvements in molds for retreading tires and the like wherein tires are fully embraced and held in expanded condition while being subjected to heat during the retreading process.

The primary object of our invention is to provide an improved mold for retreading automobile tires and the like.

Another object is to provide an improved mold adapted to facilitate the placing and removing of such tires.

A further object is to provide an improved device having improved means for supporting and expanding tires within the mold.

Another object is to provide an improved device of the character described having improved and simplified means for securing a pair or mold sections around a tire to efficiently embrace the surface to be retreaded.

A further object is to provide an improved mold formed in circular sections matching circumferentially and extending entirely around the surface of the tire to be retreaded.

A still further object is to provide an improved construction adapted to simplify and facilitate the construction and operation of the mold.

We accomplish these and other objects by means of the improved device disclosed in the drawings forming a part of the present application wherein like characters of reference are used to designate similar parts throughout the specification and drawings and in which, Fig. 1 is a broken front elevation of our improved retreading mold;

Fig. 2 is a broken plan view of the mold;

Fig. 3 is a broken side elevation of the mold, partly in vertical section;

Fig. 4 is a sectional detail, drawn upon a larger scale, of the tire expanding means;

Fig. 5 is a broken side elevation of a portion of the mold, drawn upon a larger scale, and showing the means by which the mold sections are clamped in close relation; and Fig. 6 is a broken sectional detail of an actuating connection showing the manner in which it is connected between its mounting member and its tire expanding lever.

Referring to the drawings, the numeral 1 is used to designate in general a pair of matching circular mold sections hingedly connected at one side by means of suitable hinge portions 2 and having concave annular recesses 3 arranged to receive the tread portion of a tire 4 to be retreaded. The sections 1 are made hollow to form annular steam passages 6 into which steam is introduced through flexible steam connections 7 connected into the mold sections in any convenient manner; preferably adjacent the hinge portions 2. Flexible exhaust connections 8 are connected into the bottoms of the sections 1 to carry off steam and condensation from said sections. One of the sections 1 is secured upon a suitable supporting frame 9 by means of lugs 11 formed upon said section and bolted or otherwise secured upon the frame.

A mounting rim, 12, is mounted concentrically with the mold sections 1, said rim being secured upon the outer ends of radial spokes 13 secured upon a hub flange 14, which is in turn secured upon the frame 9. The rim is provided with an annular flange 16 formed upon the rearward side of the rim, said rim being arranged to receive a tire rim 17 removably clamped against the flange 16 by means of suitable rim lugs 18 secured upon the rim 12. The tire rim 17 is of the ordinary form and is arranged to receive the tire 4 and support the same within the mold sections 1.

The mold sections 1 are provided with clamping means for clamping the sections in close relation around the tire 4, said means consisting of a plurality of yokes 21 pivotally secured to lugs 22 formed upon one of the sections and arranged to straddle legs 23 formed upon the other section. Tightening screws 24 are threaded through the free ends of the yokes 21 and arranged to bear against the lugs 23 for forcing the sections into tightly closed relation.

A pair of rings 26 are mounted adjacent the side portions of the tire 4 and arranged to engage said side portions between the tire rim 17 and the edges of the mold sections 1. The rings are arranged to be moved to press the side portions of the tire together by means of levers 27 pivotally fulcrumed upon pins 28 engaging brackets 29 secured to the rim 12, said levers 27 being slotted at their outer ends, as at 30, to pivotally and slidably engage lugs 31 extending outwardly from the rings 26. Actuating members 32 engage the inner ends of the levers 27 for moving said levers to press the rings 26 against the sides of the tires, said members 32 preferably consisting of threaded rods, threaded through the ends of the levers 27 and pivotally bearing against suitable mounting elements 33 secured upon the spokes 13, the outer ends of said rods being squared whereby a wrench or other suitable turning tool may be applied for tightening or loosening the rod.

In operation, the movable mold section 1 is swung outwardly upon the hinge portions 2 and a tire 4 to be retreaded is placed within the mold, said tire being mounted upon a tire rim 17 in the ordinary manner and the tire rim secured upon the rim 12, as above described. Before mounting the tire 4 upon the rim, a resilient pad 34 is fitted into the tire. After the tire has been mounted upon the rim 12, the movable sections 1 is swung back and clamped in close relation to the opposite section 1 by means of the yokes 21, said yokes being swung into engagement with the adjacent lug 23 and the tightening screws 24 being advanced to press the sections firmly together, as best shown in Fig. 5 of the drawings. The outer ring 26 is removed by withdrawing the pivot pins 28 from the brackets 29 to permit the tire to be inserted into the mold.

After the tire 4 has been inserted in the mold, the outer ring 26 is replaced and the levers 27 returned to normal engagement therewith, as shown in Fig. 3 of the drawings. The rods 32 are then operated to swing the levers 27 upon their fulcrums and press the rings 26 inwardly against the sides of the tire, and to press the sides of the tire together as shown in Fig. 4 of the drawings. As the sides of the tire are pressed together an outward pressure is exerted upon the tire and the resilient pad 34 is compressed within the tire, thereby causing the tread portion of the tire to be expanded and firmly pressed against the inner surface of the mold. The distortion of the tire resulting from the operation of the rings 26, together with the direct outward pressure exerted and the internal pressure from the compressed pad 34 operates to effectively hold the tread firmly against the mold throughout the entire periphery thereof.

Steam is then produced through the connections 7 and the vulcanizing process carried out in the well known manner. After the process is completed the tire is released and removed from the mold in the obvious manner.

By forming the mold in annular sections hinged at one side, the placing and removing of the tire is materially facilitated and a mold obtained into which a tire may be quickly and easily inserted without subjecting the tire to any undue strain or distortion and by which the entire tread of the tire may be vulcanized at a single operation.

The specific details of form and construction are, of course, subject to modification in numerous ways without departing from the spirit of our invention. We, therefore, do not wish to restrict ourselves to the specific construction illustrated and described, but desire to avail ourselves of all modifications which may fall within the scope of the appended claims.

Having thus described our invention what we claim as new and desire to secure by Letters Patent is,

1. A tire retreading mold comprising a pair of matching circular sections arranged to receive a tire to be retreaded; means for securing the sections in closed relation around the tire; means engaging the outer surfaces of the side walls of the tire and arranged to be moved axially toward each other to press said walls together to expand the tread thereof against the inner surface of the mold; and means for circulating steam through the sections.

2. A tire retreading mold comprising a pair of matching circular sections arranged to receive a tire to be retreaded; means for supporting a tire within the mold; means for securing the sections in closed relation around the tire; means engaging the outer surfaces of the side walls of the tire and arranged to be moved axially toward each other to press said walls together to expand the tread thereof against the inner surface of the mold; and means for circulating steam through the mold sections.

3. A tire retreading mold comprising a pair of matching circular sections arranged to receive a tire to be retreaded; means for supporting a tire within the mold; means for clamping the sections in closed relation around the tire; a pair of rings arranged to engage the outer surfaces of the side walls of the tire; means for pressing the rings axially toward each other to press the side walls portion of the tire together and thereby press the tread against the inner surface of the mold; and means for circulating steam through the mold sections.

4. A tire retreading mold comprising a pair of matching circular sections arranged to receive a tire to be retreaded; means for supporting a tire within the mold; means for clamping the sections in closed relation around the tire; a resilient pad arranged to fit within the tire; a pair of rings arranged to engage the outer surfaces of the sides of the tire; means for moving the rings to press the sides of the tire inwardly and thereby compress the pad against the interior of the tire to press the tread portion of the tire against the inner surface of the mold; and means for circulating steam through the mold sections.

5. A tire retreading mold comprising a pair of matching circular sections arranged to receive a tire to be retreaded; means for clamping the sections in closed relation around the tire; a resilient pad arranged to fit within the tire; and means engaging the side walls of the tire and axially movable in opposite directions for pressing the side wall portions of the tire together to compress the pad within the tire and thereby expand the tread portion of the tire against the inner surface of the mold.

6. A tire retreading mold comprising a pair of matching circular sections arranged to receive a tire to be retreaded; means for clamping the sections in closed relation around the tire; a resilient pad arranged to fit within the tire; and a pair of rings mounted adjacent the sides of the tire; and means for moving said rings to press the sides of the tire together to compress the pad within the tire and thereby expand the tread portion of the tire against the inner surface of the mold.

7. A tire retreading mold comprising a pair of matching circular sections arranged to receive a tire to be retreaded; means for clamping the sections in closed relation around the tire; a resilient pad arranged to fit within the tire; a pair of rings mounted adjacent the sides of the tire; and means for moving the rings against opposite sides of the tire to press the sides together and compress the pad within the tire and thereby expand the tread portion of the tire against the inner surface of the mold.

8. A tire retreading mold comprising a pair of matching circular sections arranged to receive a tire to be retreaded; means for clamping the sections in closed relation around the tire; a resilient pad arranged to fit within the tire; a pair of rings mounted adjacent the sides of the tire; a plurality of levers pivotally connected to the rings; and means for moving the levers to press the sides together and compress the pad within the tire and thereby expand the tread portion of the tire against the inner surface of the mold.

9. A tire retreading mold comprising a pair of matching circular sections arranged to receive a tire to be retreaded; means for clamping the sections in closed relation around the tire; a resilient pad arranged to fit within the tire; a pair of rings mounted adjacent opposite sides of the tire; levers pivotally connected to the rings; and threaded rods engaging the levers for actuating the same to press the rings against opposite sides of the tire as and for the purpose described.

10. A tire retreading mold comprising a supporting frame; a pair of circular mold sections arranged to receive a tire to be retreaded, one of said sections being secured to the supporting frame; a rim mounted upon the frame concentric with the mold and arranged to receive a tire rim for supporting a tire within the mold; means for clamping the mold sections in closed relation around the tire; a resilient pad arranged to fit within the tire; a pair of rings mounted adjacent opposite sides of the tire; a plurality of levers pivotally mounted upon opposite sides of the rim and pivotally connected to the rings; and threaded rods engaging the levers for actuating the same to press the rings against opposite sides of the tire as and for the described purpose.

11. The combination with a tire retreading mold, of a rim mounted concentrically with the mold and arranged to receive a tire rim for supporting a tire within the mold; a pair of rings mounted adjacent the sides of the tire; and levers pivotally connected to the rim and rings and movable to press the rings against the sides of the tire to expand the tread of said tire against the inner surface of the mold.

12. The combination with a tire mold, of an annular ring movable transversely against a side of a tire supported within the mold to expand the tread of said tire against the inner surface of the mold.

13. The combination with a tire mold, of a pair of annular rings movable against opposite sides of a tire supported within the mold to expand the tread of said tire against the inner surface of the mold.

In witness whereof we hereunto set our signatures.

FRANK L. SMITH.
JACOB S. CAUFIELD.
CHARLES J. PETERSON.

to receive a tire to be retreaded; means for clamping the sections in closed relation around the tire; a resilient pad arranged to fit within the tire; and means engaging the side walls of the tire and axially movable in opposite directions for pressing the side wall portions of the tire together to compress the pad within the tire and thereby expand the tread portion of the tire against the inner surface of the mold.

6. A tire retreading mold comprising a pair of matching circular sections arranged to receive a tire to be retreaded; means for clamping the sections in closed relation around the tire; a resilient pad arranged to fit within the tire; and a pair of rings mounted adjacent the sides of the tire; and means for moving said rings to press the sides of the tire together to compress the pad within the tire and thereby expand the tread portion of the tire against the inner surface of the mold.

7. A tire retreading mold comprising a pair of matching circular sections arranged to receive a tire to be retreaded; means for clamping the sections in closed relation around the tire; a resilient pad arranged to fit within the tire; a pair of rings mounted adjacent the sides of the tire; and means for moving the rings against opposite sides of the tire to press the sides together and compress the pad within the tire and thereby expand the tread portion of the tire against the inner surface of the mold.

8. A tire retreading mold comprising a pair of matching circular sections arranged to receive a tire to be retreaded; means for clamping the sections in closed relation around the tire; a resilient pad arranged to fit within the tire; a pair of rings mounted adjacent the sides of the tire; a plurality of levers pivotally connected to the rings; and means for moving the levers to press the sides together and compress the pad within the tire and thereby expand the tread portion of the tire against the inner surface of the mold.

9. A tire retreading mold comprising a pair of matching circular sections arranged to receive a tire to be retreaded; means for clamping the sections in closed relation around the tire; a resilient pad arranged to fit within the tire; a pair of rings mounted adjacent opposite sides of the tire; levers pivotally connected to the rings; and threaded rods engaging the levers for actuating the same to press the rings against opposite sides of the tire as and for the purpose described.

10. A tire retreading mold comprising a supporting frame; a pair of circular mold sections arranged to receive a tire to be retreaded, one of said sections being secured to the supporting frame; a rim mounted upon the frame concentric with the mold and arranged to receive a tire rim for supporting a tire within the mold; means for clamping the mold sections in closed relation around the tire; a resilient pad arranged to fit within the tire; a pair of rings mounted adjacent opposite sides of the tire; a plurality of levers pivotally mounted upon opposite sides of the rim and pivotally connected to the rings; and threaded rods engaging the levers for actuating the same to press the rings against opposite sides of the tire as and for the described purpose.

11. The combination with a tire retreading mold, of a rim mounted concentrically with the mold and arranged to receive a tire rim for supporting a tire within the mold; a pair of rings mounted adjacent the sides of the tire; and levers pivotally connected to the rim and rings and movable to press the rings against the sides of the tire to expand the tread of said tire against the inner surface of the mold.

12. The combination with a tire mold, of an annular ring movable transversely against a side of a tire supported within the mold to expand the tread of said tire against the inner surface of the mold.

13. The combination with a tire mold, of a pair of annular rings movable against opposite sides of a tire supported within the mold to expand the tread of said tire against the inner surface of the mold.

In witness whereof we hereunto set our signatures.
FRANK L. SMITH.
JACOB S. CAUFIELD.
CHARLES J. PETERSON.

DISCLAIMER 1,662,035.—*Frank L. Smith, Jacob S. Caufield,* and *Charles J. Peterson,* Sacramento, Calif. RETREAD MOLD FOR TIRES. Patent dated March 6, 1928. Disclaimer filed May 18, 1939, by the assignee, *Super Mold Corporation of California.*

Hereby enters this disclaimer to claim 12 in said specification.

[*Official Gazette June 13, 1939.*]

DISCLAIMER 1,662,035.—*Frank L. Smith, Jacob S. Caufield,* and *Charles J. Peterson,* Sacramento, Calif. RETREAD MOLD FOR TIRES. Patent dated March 6, 1928. Disclaimer filed May 18, 1939, by the assignee, *Super Mold Corporation of California.*

Hereby enters this disclaimer to claim 12 in said specification.
[*Official Gazette June 13, 1939.*]